United States Patent

Maricle et al.

[15] 3,654,525

[45] Apr. 4, 1972

[54] ELECTROCHEMILUMINESCENT DEVICE INCLUDING ONE OF NAPHTHACENE, PERYLENE AND 5, 6, 11, 12-TETRAPHENYL-NAPHTHACENE IN APROTIC SOLVENT

[72] Inventors: Donald Leonard Maricle, Ridgefield; Michael McKay Rauhut, Norwalk, both of Conn.

[22] Filed: Oct. 23, 1965

[21] Appl. No.: 504,111

Related U.S. Application Data

[63] Continuation-in-part of Ser. No. 382,408, July 13, 1964, abandoned.

[52] U.S. Cl. ................................317/230, 204/131, 313/358
[51] Int. Cl. .........................................H01g 9/00, B01k 3/00
[58] Field of Search.................................................204/59

Primary Examiner—Robert Segal
Attorney—Charles J. Fickey

EXEMPLARY CLAIM

1. An electroluminescent device including a container having disposed therein a pair of electrodes and a solution of a polynuclear condensed aromatic hydrocarbon in an aprotic solvent, the said aromatic hydrocarbon being selected from the group consisting of naphthacene, perylene and 5, 6, 11, 12-tetraphenylnaphthacene, the said electrodes and container being chemically inert with respect to said solution.

1 Claims, No Drawings

ELECTROCHEMILUMINESCENT DEVICE INCLUDING ONE OF NAPHTHACENE, PERYLENE AND 5, 6, 11, 12-TETRAPHENYL-NAPHTHACENE IN APROTIC SOLVENT

This application is a Continuation-in-part of Ser. No. 382,408, filed July 13, 1964, now abandoned.

The present invention relates to solution phase electroluminescence. It has been found, pursuant to the instant discovery, that visible electroluminescent emission may be generated by applying alternating current, at a sufficient voltage, to the electrodes, e.g., platinum, mercury, or the like, of an electrolytic cell in an inert solvent containing a fluorescent organic compound and a suitable supporting electrolyte.

Typically, dimethylformamide (DMF) solvent containing $2 \times 10^{-3}$ mole of rubrene as the fluorescent compound and 0.1 mole of tetrabutylammonium perchlorate as the supporting electrolyte is a system which will emit light, without any appreciable consumption of the solution components of the system as compared to prior systems, when placed in an electrolytic cell containing electrodes and 60-cycle alternating current applied to the electrodes. Visible light is emitted at or near each electrode surface as long as alternating current of sufficient voltage is applied.

Pursuant to the instant discovery, therefore, a method of generating a useful, visible, electroluminescent emission in an electrolytic cell has been found which comprises subjecting an electrolytic cell containing at least two electrodes in a medium comprising an inert solvent, a fluorescent organic compound, and a supporting electrolyte to an alternating current at a sufficient voltage (potential) at at least one electrode to convert said fluorescent organic compound to its corresponding oxidized or reduced state, by giving up or taking on at least one electron, and said alternating current providing sufficient potential change on reversal of the alternating cycle to provide an amount of energy about sufficient to ultimately transform (regenerate) said fluorescent organic compound to its original oxidation state but in its singlet excited state. The compound rapidly returns to its ground (non-excited) state by the emission of light.

As just indicated, the fluorescent organic compound is either alternately oxidized to an oxidized state (i.e., a cation radical) in what is the anodic excursion of the applied potential and reduced to the excited state of the fluorescent organic compound in what is the cathodic excursion of the applied potential; or the fluorescent organic compound is reduced to a reduced state (i.e., an anion radical) in what is the cathodic excursion of the applied potential and oxidized to the excited state of the fluorescent organic compound in what is the anodic excursion of the applied potential. Fluorescent compounds which emit red light upon excitation require the least anodic or cathodic voltage excursion and, consequently, the least voltage change at an electrode to provide visible light. On the other hand, fluorescent compounds which emit blue light upon excitation require greater anodic or cathodic excursions and higher voltage change at the electrode.

The upper and lower limits of the instantaneous potential applied to the electrode required to produce light will depend on the fluorescent organic compound used. Thus either the upper limit of the applied potential must be sufficiently positive to convert the fluorescent organic compound to an oxidized state or the lower limit of the potential applied to the electrode must be sufficiently negative to convert the fluorescent organic compound to a reduced state. Moreover, the potential difference between the upper and lower values of the instanteous applied potential must be at least about sufficient to provide enough energy to produce said fluorescent organic compound in its singlet excited state.

In general terms, the process described above requires only electron transfer to a cation radical or electron transfer from an anion radical in an electrolyte cell where electron transfer occurs over a sufficient potential to provide an excited state, and where the resulting excited state or a subsequently formed excited state is capable of fluorescent emission of light. The general process is described in equation (1) and (2) below where "A+" and "A−" refer to a cation radical and an anion radical respectively, "E" refers to an electron, and "A*" refers to an excited state produced by electron transfer.

(1) $A^+ + E \longrightarrow A^*$
(2) $A^- - E \longrightarrow A^*$

The singlet excited state of the fluorescent organic molecule may be obtained directly typically as in equation (3) or by an indirect route, typically as shown in equation (4) below.

(3) (a) $A^+ + A^- \longrightarrow A^* + A°$; (b) $A^* \longrightarrow A° + \text{light}$
(4) (a) $A^+ + A^- \longrightarrow A^* + A°$; (b) $2A^* \longrightarrow A^* + A°$; (c) $A^* \longrightarrow A° + \text{light}$ The potential difference required by the indirect route normally is lower than that required by the direct route.

Generally, the potential difference between the upper and lower limits of the instantaneous applied voltage must exceed about 1.5 volts.

Potentials (relative to a standard electrode, such as the saturated calomel electrode,) required to oxidize or reduce organic compounds of the type contemplated herein can be easily measured by standard polarographic techniques. Cf. I. M. Kolthoff and J. J. Lingane, Polarograph, 2nd Edition, 1952, Interscience Publishing, N. Y., N. Y. Likewise, minimum energy required for converting organic compounds of the type contemplated herein to their singlet excited states are easily measured by such techniques as absorption or emission spectroscopy. Cf. S. F. Mason, Molecular Electronic Absorption Spectra, Quarterly Reviews, 15, 287 (1961).

The process of the present invention has, as will be seen hereinafter, multiple uses in the fields of illumination, information display, etc. For instance, the electrolytic cell of Example 1, infra, is in essence a light bulb, the electrolytic cell comprising a stoppered transparent bottle having two electrodes therein, the ends of which are immersed in the fluorescent-solvent-electrolyte system. If desired, the bulb-shaped cell could be replaced by a tubular, or cube-shaped cell, or by any other design desired. Likewise, multiple pairs of electrodes may be used in any given cell, each pair operating independently, if desired. Still other uses will be discussed in greater detail hereinafter.

Obviously, as indicated hereinabove, the solution system as well as the nature of the electrode determine the upper limit of the potential difference. Insofar as the frequency of the applied alternating voltage is concerned, it can range from a few cycles per minute up through the audio range and beyond.

Numerous organic fluorescent compounds are capable of yielding visible light when alternating current, at a sufficient voltage, is applied thereto pursuant to the instant discovery. Typical of these are fluorescent aromatic polycyclic hydrocarbons and polycyclic heterocyclic fluorescent compounds. Among these compounds are: 1,4D-dimethoxy-anthracene; 1-methoxy-9,10-diphenyl anthracene; 1,4-dimethoxy-9,10-diphenyl anthracene; 2,3-benzofluoranthrene; anthracene; rubrene; pyrene; coronene; decacylene; β-dinaphthylene oxide; 1,3-diphenylisobenzofuran (i.e., 2,7-diphenylisobenzofuran—

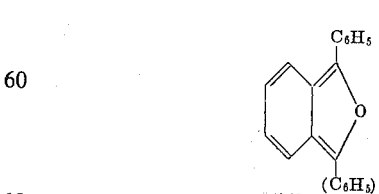

1,7-phenanthroline; benzo-(1,2,3-g,h: 4,5,6-g',h')-diphenanthridine; N-methyl phenothiazine; and the like.

Other examples among these above typical compounds are: 2,7-bisdimethylaminonaphthalene (gives blue light); 2,7-p-xenyl-3,6-diphenylisobenzofuran (gives green light); 1,4-bis-(methylthio)naphthalene (gives white light); 1,4-dimethoxynaphthalene (gives blue-green light); 9,10-bis-methylthio)anthracene (gives yellow light); 9-methoxyanthracene (gives orange-yellow light); 9,10-dimethoxyanthracene (gives green light); 2,6-bisdimethylaminoanthracene (gives blue light); 9,10-diphenoxyanthracene (gives blue-green light); 1,2-bis(9,9'-dianthracenyl)ethylene (gives red light); 10,10'-dimethoxy-9,9'-dianthracene (gives blue-green light); β-dimethylaminonaphthalene (gives blue light); perylene; 9-phenylanthracene (gives blue light); N,N,N',N'-tetramethylbenzidine (gives blue light); 9,10-bis(2,6-dimethoxy-phenyl)anthracene; 9,10-bis(phenylethynyl)anthracene; orthoquinoidol compounds such as 2,3,6,7-tetraphenylisobenzothiophene

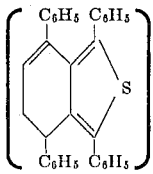

3,4,6,7-tetraphenylisobenzofuran, and 2,3,4,5,6,7-hexaphenylisobenzofuran

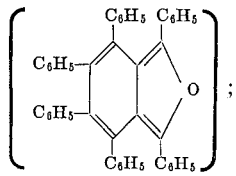

7,7,8,8-tetraphenylquinodimethane; 9,10-diphenylanthracene; 1,4,5,8-tetraphenylnaphthalene; 7,7,8,8-tetraphenylquinodimethan

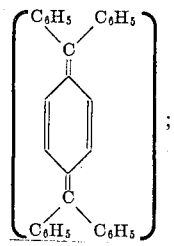

1,4-diphenyl-1,3-butadiene; 1,1,4,4-tetraphenylbutadiene; quarterphenyl; benzophenanthranthrene i.e., chrysene); naphthacene; coronene; decacyclene; 1,2,5,6-dibenzanthracene (i.e., dinaphthanthracene); etc.

A wide variety of supporting electrolytes may be employed herein to effect the invention. It is essential that these electrolytes do not hinder to any substantial degree the necessary anodic or cathodic excursion, for instance, and thus prevent conversion of the organic fluorescent compound to its excited state. It will be recognized by the person skilled in the art that a non-interfering electrolyte for one organic fluorescent compound may interfere with another organic fluorescent compound, and vice versa. Obviously, therefore, it is within the purview of the instant discovery and within the skill of a chemist to employ an electrolyte which is compatible with the organic fluorescent compound employed. The electrolyte should likewise be electro-inactive over the potential range required for the luminescent reaction, it should provide satisfactory conductivity, and it should not quench the luminescence.

Typical suitable electrolytic cations are tetraalkyl(lower)ammonium ions, alkali metal ions, alkaline earth ions, and the like. Typical anions are perchlorate ions, hexafluoroarsenate ions, hexafluoraphosphate ions, chloride ions, bromide ions, and the like. Thus, typical compounds include tetraethylammonium bromide, tetraethylammonium perchlorate, tetra-n-butyl ammonium perchlorate, lithium bromide, sodium perchlorate, tetramethylammonium hexafluOrOarsenate, tetrabutylammonium tetraphenyl borate, calcium perchlorate, tetrapropyl ammonium hexafluorophosphate, lithium aluminum chloride, tetrabutyl ammonium bromide, etc.

Insofar as solvents are concerned, a wide variety of these may be employed. In fact, any substantially inert organic or inorganic solvent for the organic fluorescent compound and electrolyte, which solvent is sufficiently nonprotonating and irreducible to preserve the desired degree of reversibility (i.e., it should provide a lifetime of the radical ion at least equivalent to the reciprocal of the frequency employed) is satisfactory provided it is rendered conducting by the addition of an electrolyte of the type contemplated herein.

Typical solvents are the following aprotic solvents: nitriles, such as acetonitrile; sulfoxides, such as dimethylsulfoxide; ethers, such as tetrahydrofuran, dioxane, diethyl ether, dimethoxyethane, and the like; amides, such as dimethylformamide; carbonates, such as propylene carbonate; nitroalkanes, such as nitromethane; dialkyl sulfites, such as dimethylsulfite; and other like solvents.

It is not necessary that these solvent be anhydrous, since up to about 10 percent water has been present in some cases without interfering with the emission of visible light. The person skilled in the art will recognize that numerous other substantially inert organic and inorganic solvents, even though not essentially or substantially aprotic, are compatible with the process and solution system and are substantially not fluorescence quenchers. Solvent mixtures may likewise be employed.

In conjunction with the excited state referred to hereinbefore, it should be noted that the "energy of an excited state" is an easily measured experimental value. For example, the energy difference between a first excited singlet and its corresponding ground state is defined by the frequency of the first absorption band in the ultraviolet or visible spectrum of the ground state species.

The physical energy released by a reaction is also an experimental quantity. For instance, the energy of a reaction of the type given in the specific embodiment described above can be determined by polarographic measurements and other procedures well known to the physical chemist.

Thus the operable limits of the electroluminescence are capable of independent measurement and of clear definition in terms of physical characteristics. Consequently, generating electroluminescent emission by the process contemplated herein can be accomplished by first recognizing the known physical characteristics of the fluorescent organic compound, as well as the physical characteristics of the inert solvent and the electrolyte to be used. It has been found, however, that the potential change during the electrode excursion can be several tenths of a volt less than that required to provide the energy of a singlet excited state and still be sufficient to generate noticeable light emission. Best results are generally obtained, however, when the calculated singlet excitation energy or more is provided. It should also be noted that the voltages referred to are exclusive of additional voltages that might be required to overcome the electrical resistance of the solvent-electrolyte employed.

The temperature at which the process of the present invention is carried out is not critical; very excellent results have been achieved at ambient temperatures. For best results the solvent employed is deaerated, such as by bubbling nitrogen, or the like, therethrough, thus providing improved conditions and helping to insure a substantially inert solvent.

EXAMPLE I

Into a 50-milliliter, rubber-stoppered bottle containing 30 milliliters of dimethylformamide (DMF) solvent (through which nitrogen has been bubbled to substantially deaerate same) are introduced sufficient tetrabutylammonium perchlorate and rubrene to provide, respectively, a 0.1 molar solution of the electrolyte and a $2 \times 10^{-3}$ molar solution of the organic fluorescent compound. Two platinum electrodes each having one square inch platinum grids on the ends thereof are passed through the stopper into the bottle, the grid ends, of course, being immersed in the solution. These electrodes, in

| Example No. | Organic fluorescent compound (a) | Electrolyte (b) | Molar concentration (a) | (b) | Solvent (c) | Alternating current Frequency+ | Volts [1] |
|---|---|---|---|---|---|---|---|
| XII | Rubrene | Tetrabutyl-ammonium perchlorate. | $2\times10^{-3}$ | 0.1 | DMF | 0.3 | [2] 2.5 |
| XIII | do | do | $2\times10^{-3}$ | 0.1 | DMF | 30 | 5 |
| XIV | do | do | $2\times10^{-3}$ | 0.1 | DMF | 100 | 10 |
| XV | 2,3-benzofluoranthrene | Sodium perchlorate | $2\times10^{-3}$ | 0.1 | Glyme | 60 | 20 |
| XVI | Dinaphthalene oxide | Tetramethyl ammonium hexafluoro arsenate. | $2\times10^{-3}$ | 0.1 | Propylene carbonate | 60 | 5 |
| XVII | 1,3-diphenylisobenzofuran | Tetrabutyl ammonium tetraphenyl borate. | $3\times10^{-3}$ | 0.1 | Tetrahydrofuran | 60 | 20 |
| XVIII | 1,7-phenanthroline | $Ca(ClO_4)_2$ | $10^{-3}$ | 0.1 | Dimethylsulfoxide | 60 | 7 |
| XIX | 1,10-phenanthroline | $LiClO_4$ | $4\times10^{-3}$ | 0.1 | Ethylene diamine | 60 | 15 |
| XX | Benzo-(1,2,3-g,h: 4,5,6,g'h')diphenanthradine. | Tetrabutyl ammonium perchlorate. | $2\times10^{-2}$ | 0.1 | Glyme | 60 | 10 |
| XXI | N-methyl phenothiazine | Tetrapropyl annomium hexafluorophosphate. | $3\times10^{-3}$ | 0.1 | Propylene carbonate | 60 | 10 |
| XXII | 9,10-diphenylanthracene | Tetrabutyl-ammonium perchlorate. | $10^{-2}$ | 0.8 | Glyme | 60 | 15 |
| XXIII | do | do | $5\times10^{-2}$ | 0.5 | do | 60 | 12 |
| XXIV | do | do | $1\times10^{-2}$ | 0.1 | do | 60 | 10 |
| XXV | do | do | $1\times10^{-3}$ | 0.1 | Tertiary butanol | 60 | 20 |
| XXVI | 1-methoxy-9,10-diphenylanthracene | $LiAlCl_4$ | $10^{-3}$ | 1.0 | Nitromethane | 60 | 10 |
| XXVII | 1,4-dimethoxy-9,10-diphenylanthracene. | Tetrabutyl-ammonium bromide. | $10^{-3}$ | 0.1 | Dimethylsulfite | 60 | 7 |
| XXVIII | Pyrene | $MgClO_4$ | $2\times10^{-2}$ | 0.1 | DMF | 20 | 15 |
| XXIX | Coronene | Tetrabutyl-ammonium perchlorate. | $10^{-3}$ | 0.1 | Glyme | 60 | 20 |
| XXX | Decacyclene | do | $10^{-3}$ | 0.1 | do | 60 | 20 |
| XXXI | 1,4-dimethoxyanthracene | Sodium perchlorate | $10^{-3}$ | 0.1 | Dimethyl sulfoxide | 60 | 10 |

[1] Total volts applied to cell.
[2] In square waves (peak to peak).
+ Cycles per second.

their vertical positions, are spaced about one-half inch apart and alternating current (60 cycle) is passed therethrough at 3 volts. The grids light up and this visible light is evident so long as the current remains on.

EXAMPLE II – VIII

Example I is repeated in every essential respect with the exception that the following fluorescent compounds, electrolytes and solvents are employed at the concentrations given:

| Example No. | Organic Fluorescent Compound (a) | Electrolyte (b) | Molar Concentration (a) | (b) | Solvent (c) |
|---|---|---|---|---|---|
| II | rubrene | lithium bromide | $2\times10^{-3}$ | 0.1 | DMF |
| III | rubrene | tetrabutyl ammonium perchlorate | $2\times10^{-3}$ | 0.1 | 95% dioxane 5% $H_2O$ |
| IV | perylene | tetrabutyl ammonium perchlorate | $2\times10^{-3}$ | 0.1 | DMF |
| V | anthracene | tetrabutyl ammonium perchlorate | $2\times10^{-3}$ | 0.1 | DMF |
| VI | 9,10-diphenyl anthracene | tetrabutyl ammonium perchlorate | $2\times10^{-3}$ | 0.1 | DMF |
| VII | N-methyl pheno thiazine | tetrabutyl ammonium perchlorate | $2\times10^{-3}$ | 0.1 | DMF |
| VIII | 9,10-diphenyl anthracene | tetrabutyl ammonium perchlorate | $2\times10^{-3}$ | 0.1 | glyme (1,2-dimethoxy-ethane) |

As in Example I, supra, the grids light up and visible light is evident in each of these examples so long as the current is on.

EXAMPLE IX

Example I, above, is repeated in every essential respect with the exception that carbon is used in lieu of platinum on the electrode. Visible light is emitted when the current is applied.

EXAMPLE X

Example I, above, is repeated in every essential respect with the exception that stainless steel is used in lieu of platinum on the electrode. Visible light is emitted when the current is applied.

EXAMPLE XI

Example I, above, is repeated in every essential respect with the exception that tantalum is used in lieu of platinum on the electrode. Visible light is emitted when the current is applied.

The following examples further illustrate the present invention, all of which are carried out essentially as in Example I, supra, excepting as shown.

The examples in the above table produce a visible electroluminescent emission. In Examples I through XI, and XIII through XXXI, above, voltage is varied with respect to time as a sine wave function.

While the above table shows frequencies on the order 0.3 to 100 cycles per second, substantially higher frequencies — as indicated hereinbefore — may be employed. For instance, the frequencies of Examples XIII, XVII, XXI and XXVI may be changed to 500, 1000, 10,000 and 15,000, respectively, without materially modifying the electroluminescent emission.

Uses for the present invention other than those discussed hereinabove involve establishing spaced apart plates, screens or similar surfaces which act as electrodes; one or more of said surfaces may be meshed, perforated or translucent, if desired. Between these surfaces the fluorescent-solvent-electrolyte system, preferably in a gel form, is placed and alternating current passed through the electrodes and, of course, the intervening system. Upon illumination of the electrodes visible light can be seen.

One or both of these electrodes could contain information, such as that provided by various perforations. The electrodes, should they be solid, translucent sheets, could be covered by a stencil containing information, thus only the light passing through the stencil being visible. Obviously, multiple individual electrode pairs, the electrodes being of the type just described, could be used, allowing greater flexibility in their use as information displays.

According to still another use embodiment of the present invention, a multiplicity of electrodes of any shape (e.g., straight rods, curved rods, tapered rods, etc.) may be placed on a panel and the electrodes immersed in a system (gel or solution) of the type contemplated herein, the electrodes being connected in pairs, or in any other suitable manner, to the alternating current. By controlling the current on each of these pairs various information could be produced on the panel.

As to the embodiments referred to hereinabove wherein the fluorescent-solution-electrolyte system is a gel, the following examples are typical:

EXAMPLE XXXII

Example XIII, supra, is repeated in every essential respect with the exception that 30% by weight of polyacrylamide is dissolved in the solvent. A gel results which may be used as above indicated, such as between two electrode plates in sandwich-like fashion.

EXAMPLE XXXIII

A solution of 10 percent acrylamide, 10 percent methylene bisacrylamide, 0.5% $\alpha,\alpha$-azobisisobutyronitrile, $5\times10^{-3}$ molar rubrene, 0.1 molar tetrabutylammonium perchlorate in dimethylformamide in which is immersed two platinum electrodes is warmed at 60° C. for several hours until polymerization is essentially complete. A semisolid gel is obtained. Application of 60-cycle alternating current at 5 volts provides a yellow light.

If desired, the electrolytic cell container, translucent or transparent, may be coated (e.g., exteriorly) with a fluorescent material and light emitted at the electrodes converted by means of this material to a light of a longer wavelength. The following examples are illustrative:

EXAMPLE XXXIV

Example VI, above, is carried out in a glass container coated on outside with a 5 millimeter thick film of polystyrene containing 1 percent Rhodamine B. Red light (rather than blue) is emitted on application of alternating current.

EXAMPLE XXXV

Example XXXIV is repeated only 1 percent eosin is used in lieu of Rhodamine B.

Numerous modifications will be evident from the fluorescent art. Thus, instead of an organic fluorescent dye (as in Examples XXXIV and XXXV), a "crystal phosphor" may be employed in the coating. Cf. P. Pringsheim, *Fluorescence and Phosphorescence*, Interscience Publishers, N.Y., 1949, Chapter VII.

Clearly the instant discovery encompasses numerous modifications within the skill of the art. Consequently, while the present invention has been described in detail with respect to specific embodiments thereof, it is not intended that these details be construed as limitations upon the scope of the invention, except insofar as they appear in the appended claims.

We claim:

1. An electroluminescent device including a container having disposed therein a pair of electrodes and a solution of a polynuclear condensed aromatic hydrocarbon in an aprotic solvent, the said aromatic hydrocarbon being selected from the group consisting of naphthacene, perylene and 5, 6, 11, 12-tetraphenylnaphthacene, the said electrodes and container being chemically inert with respect to said solution.

* * * * *